United States Patent Office 3,176,289
Patented Mar. 30, 1965

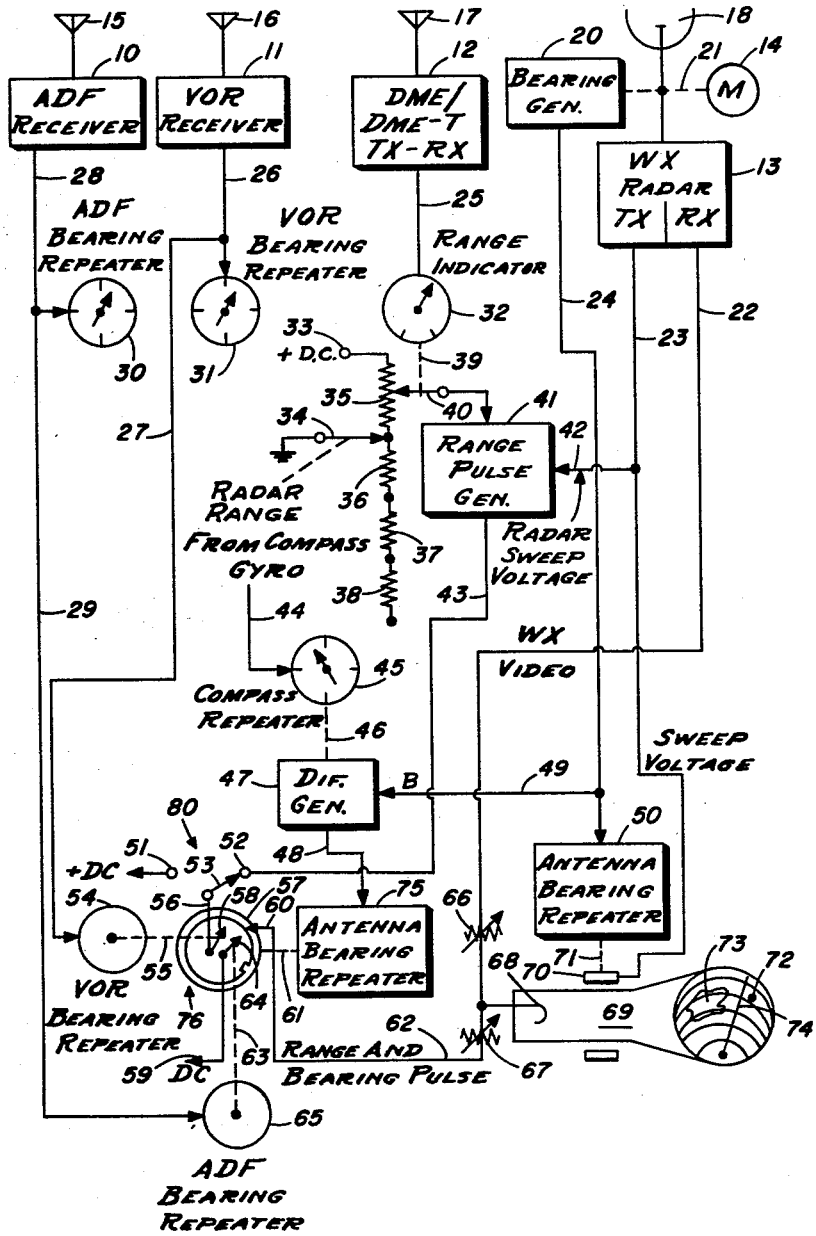

3,176,289
ELECTRONIC DISPLAY APPARATUS
Joe J. Breithaupt, Irving, Tex., assignor to Collins Radio Company, Cedar Rapids, Iowa, a corporation of Iowa
Filed Dec. 12, 1960, Ser. No. 75,350
6 Claims. (Cl. 343—6)

This invention relates generally to visual displays of navigation information and more particularly to a means for presenting a single easy-to-read pictorial display of various available aircraft navigation information upon the screen of a radar which employs a plan-position type of indication.

The present invention provides, with a minimum of complex circuitry, a simultaneous display or individual display, as desired, of a plurality of navigation aid data and plan-position radar information.

Numerous devices have been employed in the aircraft guidance art wherein a plurality of navigation aid data sources are presented on a single display instrument. In general, such efforts are directed towards as nearly a pictorial presentation as possible to minimize the number of mental calculations by the pilot. For example, systems are known wherein aircraft velocity, altitude, attitude, and steering information are commutated to the screen of a cathode-ray tube for a combined presentation.

In addition to numerous navigation aids such as ADF (automatic direction finding), VOR (variable omnirange), DME (distance measuring equipment), VOR-DME (combined variable omnirange and distance measuring equipment) and TACAN, many aircraft carry weather radar as a further navigation aid.

It is an object of the present invention to provide a means for combining the information gathered from various distance and bearing determining navigation aids into a single easy-to-read pictorial display which may be combined with the radar presentation or utilize the same visual presentation means as the radar. The present invention, therefore, enables a standard radar indicator, such as a weather radar indicator, to be utilized as a useful display and plotting board when weather phenomena does not require its use.

A further object of the present invention is the provision of a pictorial display of navigation information wherein the location and/or range of ground radio stations and navigation aids may be clearly presented in conjunction with radar information and be presented in their proper relationship with respect to the heading of the aircraft. The present invention, therefore, provides a means whereby a pilot may visually see the precise location of a ground navigation station with respect to display of weather information. The present invention enables a radar presentation to be displayed in the normal manner; enables the superposition of navigational range and bearing information with the radar information and in proper relationship thereto; and selectively allows the individual presentation of navigational range and bearing information upon the radar indicator while excluding the radar information if desired. By the present invention, a pilot may utilize a single indicator to provide a continuous visual indication of his position with respect to a particular ground location and the weather information as it relates to the particular aircraft location and proposed destination.

The present invention is featured in the provision of simple electromechanical means for pictorially displaying position and bearing data from navigation aids in their proper relationship with respect to a plan-position radar display.

Further objects and features of the present invention will become apparent upon reading the following description with reference to the accompanying drawing in which the single figure represents a functional diagram of the presentation system.

With reference to the figure, the illustrated embodiment of the invention is seen to include various navigational aids and radar equipment carried in an aircraft. An ADF receiver 10 and its associated antenna 15 provide bearing information in the form of electrical signals which might be carried through a connector 28 to an ADF bearing repeater 30 in the aircraft cockpit. For the purpose of the present invention, the output from the ADF receiver 10 will be considered a conventional electrical signal indicative of the true ADF bearing developed by the receiver 10. A VOR receiver 11, with associated antenna 16, derives VOR bearing information in the form of an electrical signal which might operate a VOR bearing repeater 31 in the aircraft cockpit. For the purpose of the present invention, the output 26 from VOR receiver 11 will be considered as a conventional electrical signal indicative of VOR bearing. A further navigational aid in the form of distance measuring equipment 12 and its associated antenna 17, might develop an electrical signal 25 indicative of the distance or range between the aircraft and the ground station. This equipment might be the standard DME, or the DME-T equipment, but in any event the DME equipment 12 provides a measure of distance to a ground navigational aid. Thus, a pilot might tune to a VOR/DME station such that receiver 11 provides the bearing information and distance measuring equipment 12 indicates the range to the station. Although not specifically illustrated, the VOR bearing repeater 31 might be connected to indicate bearing information from a TACAN navigational aid. In any event, bearing repeater 31 and range indicator 32 would respectively provide indications of the true bearing to a ground based navigational aid and its distance if such a facility were provided. The above-described navigation aids are known and need not be discussed in detail here. By these aids the pilot is provided with individual indications of various bearings and distances from which he may mentally calculate his position and initiate actions to attain a desired flight path.

While navigation aids such as those previously discussed may tell the pilot where he is, a further flying aid in the form of a weather radar system is commonly carried by the aircraft. By means of the weather radar the pilot is informed as to the location of turbulent weather areas relative to his heading, such that corrective measures may be taken to by-pass the areas of turbulence, or to fly a deviated path through those areas of lesser turbulence. The system of the invention includes a weather radar comprised of a transceiver 13, antenna 18 and a drive motor 14 to position antenna 18 through mechanical linkage 21. The radar system might further conventionally include a bearing generator 20 driven by motor 14 and following the scanning of antenna 18 to develop an electrical output signal 24 indicative of the relative bearing of the radar beam with respect to the aircraft heading. For purposes of the present discussion, the radar develops a video output signal 22 and a sweep voltage output 23 in addition to the antenna bearing output 24. The video signal 22 is connected through a gain control 66 to the cathode 68 of a plan-position indicator 69. The sweep output 23 from radar transceiver 13 is shown conventionally connected to the beam deflection coils 70 of the indicator 69. Antenna bearing output 24 is connected to an antenna bearing repeater 50 which converts the electrical signal 24 into a mechanical rotational output 71 to position the deflection yoke 70 of the indicator 69 in a manner conventional in plan-position indicators. Antenna bearing repeater 50, then, rotates the indicator sweep to an angle corresponding to the position of radar antenna 18 relative to the aircraft heading.

The above-described navigation aids are commonly carried by aircraft and produce indications of various bearings and distances to navigation ground stations and a weather radar display. The present invention, then, functions to uniquely combine these available indications into a common pictorial display which utilizes the weather radar indicator to present a composite picture to the pilot of "where he is heading," together with the weather conditions "along-the-way."

The manner in which the system of the present invention combines the aforedescribed navigational information generally involves synchronization of radar and distance measuring equipment range data in conjunction with the radar sweep, along with a unique synchronization of navigation aid bearing data with the radar antenna bearing such that the navigation aid data may be properly oriented and visually displayed on the face of the weather radar indicator.

The electrical output 24 from the radar antenna bearing generator 20 was described as being connected to antenna bearing repeater 50 for the purpose of rotating the sweep on the indicator 69 in accordance with the relative bearing of radar antenna 18 with respect to the aircraft heading. The electrical signal 24, indicative of the antenna bearing, is additionally carried through a path 49 to a differential generator 47. Differential generator 47 receives a mechanical input 46 from a compass repeater 45 which might be positioned in accordance with electrical signals 44 from a magneto or gyro compass to indicate the true heading of the aircraft. Differential generator 47 functions, therefore, to develop an electrical output signal 48 indicative of the true bearing of the radar antenna 18. This information is connected to an antenna bearing repeater 75 which develops a mechanical shaft rotational output 61 in accordance with the instantaneous true bearing of weather radar antenna 18. The antenna true bearing information in the form of mechanical output 61 from repeater 75 is utilized in a synchronous switching means generally designated by reference number 76. Switching means 76 might be considered to include a rotatable ring member 57 in conjunction with separately rotatable rotor members 58 and 64 such that the ring contact 60 is connected to the rotor wipers 58 and 64 only when these internal wipers are aligned with the internally protruding contact on the ring member 57. The purpose of switching means 76 will be further described. For the present, it should be noted that the ring member 57, and hence the location of its internally extending contact member, is positioned in accordance with the true bearing of radar antenna 18 through mechanical connection 61 with repeater 75.

Range information from the navigation aids is transformed from a mechanical shaft indication from range indicator 32 to a range pulse for application to the indicator 69. A mechanical indication proportional to DME range is thus first converted to a direct-current voltage with an appropriate scale factor proportional to and synchronized with the radar range circuitry. Mechanical interconnection 39 from range indicator 32 positions a wiper arm 40 on resistor 35 to obtain the range indicative direct-current voltage. A source of direct-current voltage 33 is connected to one end of resistor 35 and the total voltage drop across resistor 35 is adjusted in accordance with the position of a switch 34. Switch 34 is positioned in accordance with the selected radar range to place additional resistors 36, 37, and 38 between the voltage source 33 and ground, thus changing the voltage-range scale factor in accordance with the selected radar range. Radar range is a determining function for the radar sweep voltage and defines the slope of the radar sweep voltage. Thus, a voltage from wiper arm 40 on range resistor 35 produces a direct-current voltage proportional to the DME range through mechanical interconnection 39.

Since the voltage drop across resistor 35 is proportional to radar range, the proper scale factor may be realized. The direct-current voltage proportional to DME range is applied to a range pulse generator 41. The radar sweep voltage output 23 from the radar transceiver 13 is applied through connector 42 as a second input to range pulse generator 41.

The function of range pulse generator 41 is to produce a pulse output timed with respect to the radar sweep. The pulse may be produced in conventional circuitry which compares the DME range voltage with the radar sweep voltage to produce a pulse when correspondence is realized. Such range pulse generating circuits are known in the art and need not be described in detail here.

An output 43 from range pulse generator 41 is, thus, in the form of a pulse which occurs at the time the sweep voltage corresponds to the DME range voltage. The pulse output 43 from range pulse generator 41 is connected to fixed contact 52 of a switch 80 through which (in the illustrated position) the range pulse is connected to rotor contact 58 of switching means 76.

Now, the angular position of switch rotor 58 is, in turn, determined by the VOR bearing repeater 54 which develops a mechanical output 55 indicative of the VOR bearing. Since the ring member 57 of switching means 76 is continuously positioned in accordance with the true bearing of radar antenna 18, contact between rotor 58 and ring 57 is realized at the instant that antenna 18 is oriented toward the VOR station.

Contact 60 of switching means 76 maintains continual sliding connection with ring 57 and, thus, the range pulses defining the range of the navigation aid as applied to the radar indicator 69 are in a time-magnitude synchronized relationship. The synchronous switch means 76 passes the pulse signals from the range pulse generator 41 only at the time when the deflection coils of the indicator 69 are in such a position as to indicate the relative bearing of the navigation aid station from the aircraft. Due to the fact that the range pulses produced in generator 41 occur at a specific range, and the bearing contacts of switching means 76 close only at the correct position, a pulse is presented to the cathode 68 of indicator 69 to produce a bright spot 72 on the face of indicator 69 corresponding to the position of the navigation aid station.

The above-described display resulted from utilization of navigational aids wherein both bearing and distance are available. The navigation aid might be that of a VOR station without DME facilities, in which case only a bearing is available for display. In this situation, since no range information is present, means are provided to present bearing information as a bright line on the face of indicator 69 extending radially outward from the sweep center. Provisions for this display are incorporated through a second position of selector switch 80 (arm 53 connected to contact 51). In this switch position rotor arm 58 of switching means 76 is connected to a source of direct-current voltage through contact 51 of switch 80 such that a line 74 is produced on the face of indicator 69 each time rotor arm 58 engages the contact on stator ring 57 of switching means 76.

Presentation of ADF bearings are visually indicated on the face of indicator 69 in a manner similar to the VOR bearing. A second rotor contact 64 on switching means 76 is seen to be positioned in accordance with the ADF bearing through the mechanical linkage 63 with ADF bearing repeater 65. A source of direct-current voltage 59 is, in this instance, applied through rotor contact 64 to stator ring 57 when alignment is realized to provide a line on the indicator face corresponding to the bearing of the ADF station being received.

Switch 80 (in the illustrated position) provides navigation aid display on the indicator when distance information is available. In the position of switch 80 opposite that illustrated, navigation aid bearings are indicated in situations where no distance information is available.

The above-described synchronous switching accomplished by switching means 76 thus functions to produce a bright spot on the face of indicator 69 at the relative position of navigation aid ground stations having both range and bearing determination facilities. Switching means 76 is further adapted to produce a bright line from the sweep center of the indicator in the direction of the navigation aid station being received when bearing information only is being determined. The presentation results from the application of range-azimuth pulses or the application of a source direct-current voltage to the indicator video circuitry at the moment that radar antenna 18 is oriented towards the navigation air station.

The radar video signal 22 and the navigation aid bearing and range data applied to the indicator through connector 62 may be selectively controlled in amplitude by gain controls 66 and 67 respectively. Thus, at the pilots option, radar video and navigation aid information may simultaneously be pictorially displayed or one may be displayed to the exclusion of the other. The present invention is, therefore, seen to provide a display situation of unusual utility in that it enables the presentation of destination or desired coarse, together with the related weather patterns. In the absence of weather turbulence, the weather radar indicator may still be employed as a valuable navigation display device.

Although the present invention has been described with respect to a particular embodiment thereof, it is not to be so limited as changes might be made therein which fall within the scope of the invention as defined by the appended claims.

I claim:

1. In combination with an aircraft carried radar system of the type comprising a positionable antenna, a cathode ray indicator producing an electron beam, sweep voltage generating means employed to sweep said beam for producing a visual display of video signals relative to the heading of said aircraft and including means for intensity modulation of the radar indicator beam in accordance with said video signals and angular deflection of said indicator beam in accordance with the orientation of the radar antenna with respect to said aircraft heading; means for additionally displaying the true bearing to a navigation aid station comprising switching means including first and second engageable contacts each independently circumferentially positionable about a common axis, means for mechanically positioning said first switch contact in accordance with the true bearing to said navigation aid station, bearing conversion means converting the bearing of said antenna with respect to the heading of said aircraft to a true bearing determination, the output of said bearing conversion means connected to and positioning said second switch contact in accordance with the true bearing of said antenna, means for determining the distance to said navigation aid station, means converting the navigation aid station distance determination to a direct-current voltage proportional to said radar sweep voltage corresponding to said navigation aid distance, means comparing said range proportional voltage with said sweep voltage and developing a direct-current pulse output time synchronized with correspondence between said compared voltages, means connecting said direct-current pulse to a first one of said switch contacts, the second one of said switch contacts connected to said indicator, said indicator being responsive to further intensity modulate said beam in accordance with the direct-current pulse on said first switch contact upon coincidence between said first and second switch contacts.

2. Display means as defined in claim 1 further including a source of direct-current voltage, and further switching means, said further switching means being adapted in first and second positions thereof to selectively connect one of said direct-current voltage and time synchronous direct-current pulse sources to said first one of said switch contacts.

3. Electronic display apparatus comprising a cathode-ray indicator including sweep generating means, a directional antenna rotatable about a fixed axis, antenna bearing determining means for determining the bearing of said antenna relative to a predetermined rotational position thereof, means for angularly deflecting said sweep in accordance with said antenna bearing determining means; means for intensity modulating said sweep in accordance with a source of radar developed video signals; bearing determining means for determining with respect to magnetic north the bearing of a navigation aid station, bearing conversion means for converting the output from said antenna bearing determining means to a magnetic bearing, said conversion means comprising a compass and means for differentially combining the indications of said compass and antenna bearing determining means to produce an output referenced to said compass; synchronous switching means including first and second rotary contact members each independently positionable about a common axis, said first and second contact members being adapted to form an electrical contact therebetween when respectively positioned coincident about said common axis, first positioning means associated with one of said antenna and navigation aid station bearing determining means and connected to and positioning said first contact member, second positioning means associated with the other of said antenna and nagivation aid station bearing determining means and connected to and positioning said second contact member, a source of direct-current voltage connected to one of said rotary contact members and means for connecting the other of said rotary contact members to said cathode-ray indicator to effect a further intensity modulation of said sweep upon coincidence between said first and second rotary contact members.

4. Electrical display apparatus comprising a cathode-ray indicator including means for generating a sweep voltage, radar means including a directional antenna and first bearing determining means for determining the bearing of said antenna with respect to a first predetermining reference, means for angularly deflecting the sweep generated by said voltage in accordance with said first bearing determining means; means for intensity modulating said sweep in accordance with a source of radar developed video signals; second bearing determining means for determining with respect to a second predetermined reference the bearing to a navigation aid station, distance determining means for determining the distance to said navigation aid station, means for converting the outputs from said first and second bearing determining means to a common one of said first and second predetermined references; synchronous switching means including first and second rotary contact members each independently positionable about a common axis, said first and second rotary contact members being adapted to form an electrical contact therebetween when respectively positioned coincident about said common axis, first positioning means receiving the output from one of said commonly referenced first and second bearing determining means and being connected to and positioning one of said rotary contact members, second positioning means associated with the other one of said commonly referenced first and second bearing determining means and being connected to and positioning the other one of said rotary contact members, pulse generating means receiving the output of said distance determining means and said sweep voltage and being adapted to produce therefrom a direct current pulse output time synchronous with the inputs thereto being indicative of the same distance, the output from said pulse generating means connected to a first one of said rotary contact members, and means for connecting a second one of said rotary contact means to said cathode-ray indicator to effect a further intensity modulation of said cathode-ray beam indicative of the location of said navigation aid station upon coincidence between said first and second rotary contact members.

5. Display apparatus as defined in claim 4 wherein said pulse-generating means comprises voltage dividing means, means for applying a direct-current voltage to said voltage dividing means with magnitude proportional to the range-sweep voltage relationship defining said indicator sweep, means for varying the direct-current voltage output from said voltage dividing means as a further direct function of said navigation aid station distance determination, voltage comparison means receiving said last defined variable direct-current voltage and said sweep voltage and developing from a comparison therebetween said direct-current pulse output.

6. Display apparatus as defined in claim 5 including a further switching means, a further source of direct-current voltage, said further source of direct-current voltage and the output from said pulse generating means being connected to said further switching means and individually selectively applied therethrough to said first one of said rotary contact members associated with said synchronous switching means.

References Cited by the Examiner
UNITED STATES PATENTS

| | | | |
|---|---|---|---|
| 2,654,085 | 9/53 | Goldstein | 343—6 |
| 2,927,316 | 3/60 | Granqvist | 343—6 |
| 2,962,706 | 11/60 | Hoffman et al. | 343—6 |

CHESTER L. JUSTUS, *Primary Examiner.*